United States Patent [19]

Krieger

[11] Patent Number: 4,971,027

[45] Date of Patent: Nov. 20, 1990

[54] PORTABLE STOVE

[76] Inventor: Frederick W. Krieger, 2316 Garland Dr., Missoula, Mont. 59803

[21] Appl. No.: 473,496

[22] Filed: Feb. 1, 1990

[51] Int. Cl.⁵ .............................................. F27H 1/00
[52] U.S. Cl. .................................... 126/344; 126/390; 126/59
[58] Field of Search ............... 126/344, 390, 391, 392, 126/261, 262, 29, 58, 59

[56]      References Cited
         U.S. PATENT DOCUMENTS

| 306,647 | 10/1884 | Schonheyder . | |
| 540,590 | 6/1895 | Hallowell | 126/5 |
| 550,194 | 11/1895 | Rice . | |
| 813,137 | 2/1906 | Bell . | |
| 899,026 | 9/1908 | Buren | 126/262 |
| 983,680 | 2/1911 | Butcher . | |
| 1,266,853 | 5/1918 | Peterson | 126/261 |
| 1,464,271 | 8/1923 | Rotstein et al. | 126/29 |
| 1,640,284 | 8/1927 | Mitchell . | |
| 2,070,439 | 2/1937 | Legeros | 126/392 |
| 4,271,816 | 6/1981 | Carocci | 126/132 |

FOREIGN PATENT DOCUMENTS 498351 of 1920 France .................................. 126/29

Primary Examiner—Larry Jones
Attorney, Agent, or Firm—Marger, Johnson, McCollom & Stolowitz, Inc.

[57]      ABSTRACT

A portable camp stove has an upper chamber for holding a liquid to be heated and an integral lower chamber disposed below the upper chamber. An elongated chimney with corrugated sidewall extends from the lower chamber up through the upper chamber so that, in use, the liquid in the upper chamber surrounds the chimney. A solid fuel material is combusted within the lower chamber to warm surrounding air which flows upwardly through the chimney. Heat transfer through the corrugated chimney sidewall warms the liquid. The camp stove is compact and portable, obviating the need to carry bulky stoves, fuel bottles and pot or tea kettle.

15 Claims, 2 Drawing Sheets

4,971,027

PORTABLE STOVE

BACKGROUND OF THE INVENTION

The present invention relates to heating liquids at remote campsites or in the field, and more particularly, to a compact, self-contained portable stove.

Even the heartiest outdoorsmen often enjoy a cup of coffee or other hot beverage prepared at the campsite. Many instant or dehydrated foods can be prepared using a cup or two of hot water. Open camp fires and portable gas stoves have long been used by hikers, campers, and backpackers for heating liquids such as water at remote campsites where electricity generally is not available. However, these methods are less than ideal for heating small quantities of liquid in a remote camp site where the camper must either carry in or locate fuel.

The oldest and most widely used method for heating liquids is to place the liquid in a pot and suspend or support the pot over an open fire to transfer heat to the liquid. Open campfires, however, are dangerous and difficult to control. Fuel may be scarce and difficult to ignite. Equipment for using a fire generally includes a pot and some means for supporting the pot, though logs or rocks may be adequate. Fuel, such as wood, must be provided or tools, such as an ax, for cutting wood on site.

Another known method for heating liquids in the field is the portable gas stove. This device is typically fueled by liquid propane, carried in a fuel bottle separate from the stove. Some models include an integral fuel tank for storing white gasoline or, most recently, even unleaded automobile gasoline. Although a portable gas stove can be small in size, a fuel supply and a container or pot to hold the liquid to be heated are also required for a complete liquid heating system. These necessary components are awkward to carry, and can be quite bulky. Equally important, the space occupied by the stove and other components could be used for some other important piece of camping gear where space is limited. The weight of these various components also is a drawback to a hiker, backpacker or equestrian.

Other disadvantages of using a gas stove include the exposed flame of the burner, and the time it takes to set up, use, and then take apart. Known portable stoves are inefficient because of heat lost to heating a pot or other container, and because the heat transfer site, primarily the bottom of a pot, has very limited area, and is remote from the water near the top of the pot. A short pot with a larger area provides more heat transfer area, but at the expense of increased water surface area leading to faster cooling.

Even where electricity is available, use of an electric power source for heating liquids also requires the additional components of a stove or heating element and a pot or container to hold the liquid. Thus, like the gas stove, valuable space is taken by a heating system that requires numerous components.

Accordingly, a need remains for a way to heat liquids in the field that is convenient and easy to use, compact and lightweight, simple.

SUMMARY OF THE INVENTION

An object of the present invention is to eliminate the a camper's need to carry more than one implement to a remote area to heat a liquid.

Another object is to reduce the size and weight of equipment necessary for heating a liquid in the field. Yet another object is to improve efficiency in a portable stove.

The present invention includes a camp stove that combines a heat source and a pot into a single compact unit for heating a liquid. The unit comprises an upright enclosure having an open top end and a closed sidewall. The interior of the enclosure is divided into an upper chamber and a lower chamber. The upper chamber acts as a reservoir to hold the liquid. The lower chamber houses a fuel source. To transfer heat to the liquid, a hollow elongated chimney, open at both ends with a closed sidewall, extends through the upper chamber at least to the top end of the enclosure, so that liquid in the upper chamber substantially surrounds the chimney. The bottom end of the chimney is open to the lower chamber to allow heated air to rise through the chimney. The chimney is formed of a thermally conductive material to allow maXimum heat transfer to the liquid.

A fuel plate is located in the lower chamber below the bottom end of the chimney to support solid fuel material. In operation, as the solid fuel combusts, surrounding air heated by the combusting fuel flows from the lower chamber up through the chimney and out of the top end of the of the chimney and heat transfers through the chimney sidewall to heat the liquid.

One advantage of the present invention is that it operates efficiently on small amounts of solid fuel thereby eliminating the need to use valuable space to carry bulkier liquid fuel. Also, the stove's operation on solid fuel makes the unit much safer than a conventional gas stove that operates on highly flammable liquid propane.

A second advantage is that the flame is out of sight and touch thus substantially reducing the likelihood of starting unwanted fires. The fuel is shielded by the enclosure so that the stove is operable despite adverse weather conditions such as rain or snow.

A third advantage is that its reservoir can be used for storage when the stove is not in use.

The foregoing and additional objects, features, and advantages of the present invention will be more readily apparent from the following detailed description of a preferred embodiment which proceeds with reference to the accompanying drawings.

BRIEF DESCRIPTION OF THE DRAWING

FIG. 3 is a cross-section taken along line 3—3 of FIG. 1.

DESCRIPTION OF THE PREFERRED EMBODIMENT

Figure 1:
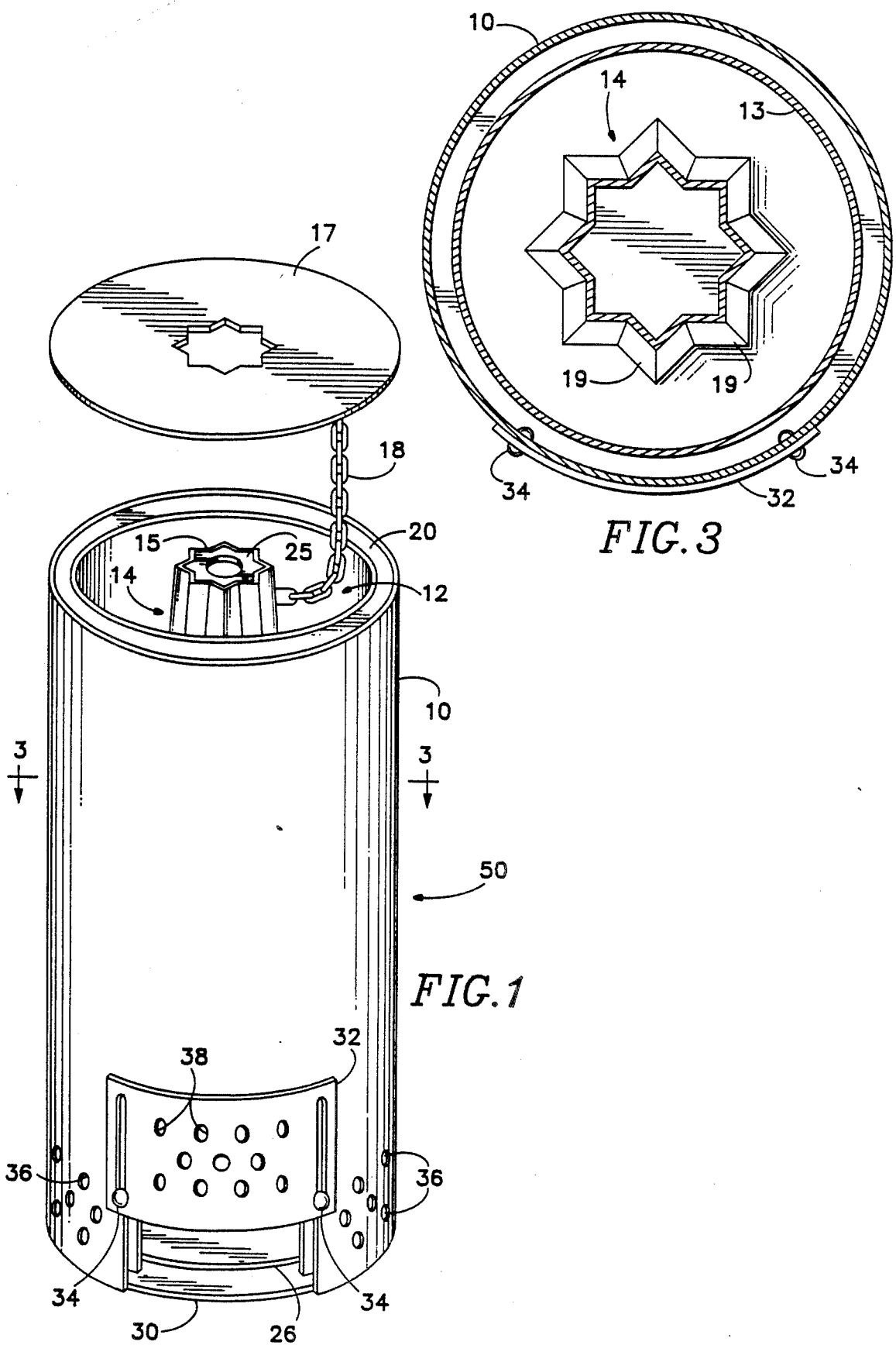
FIG. 1 is a perspective view of a portable stove according to the present invention, showing the lid raised, and the door in an opened position.
Figure 2:
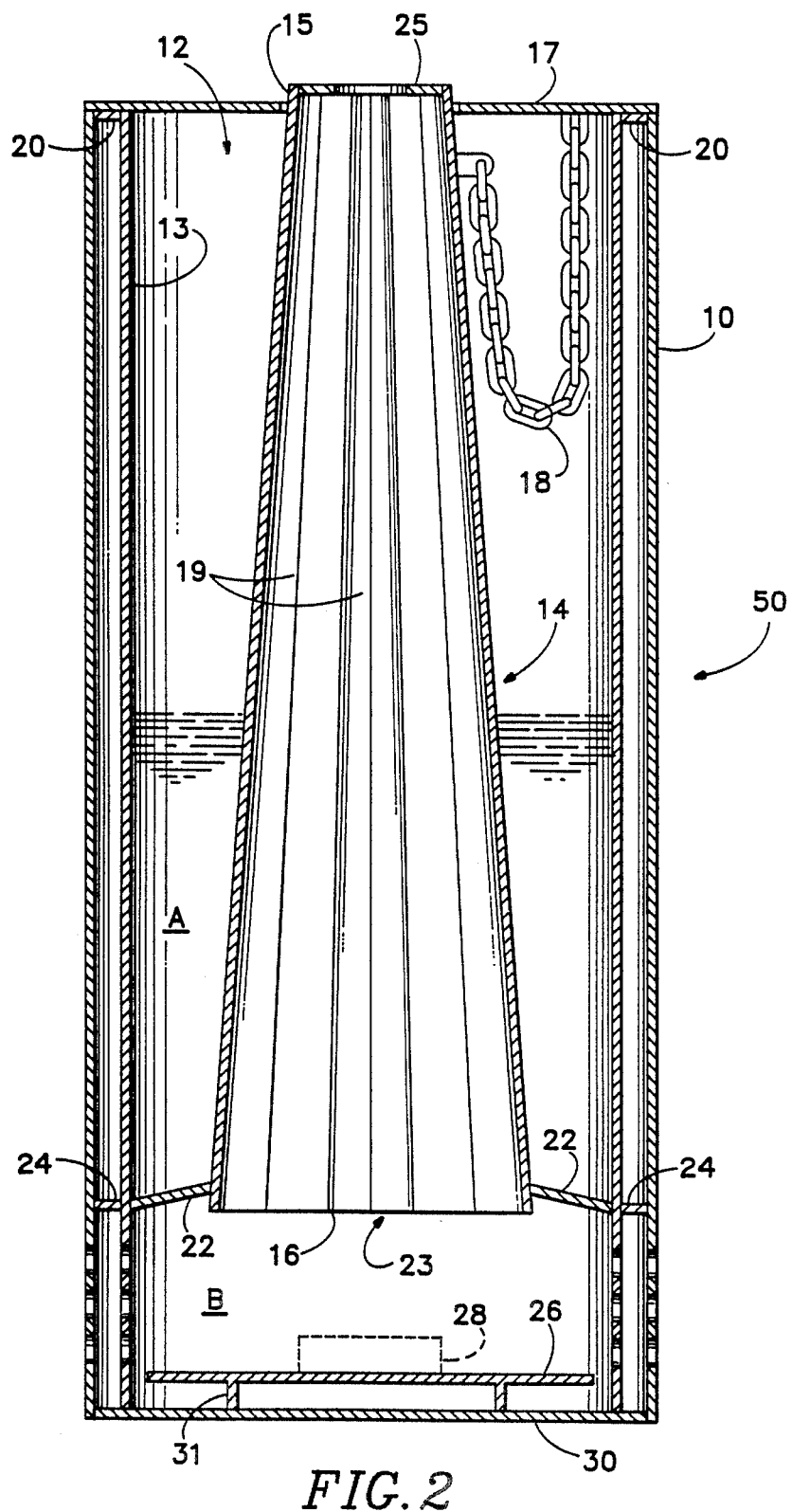
FIG. 2 is a vertical sectional view of the portable stove of FIG 1.

FIGS. 1-3 depict a portable stove 50 for heating liquids in the field. Referring to FIG. 2, a cylindrical enclosure 12 is made of a rigid, heat resistant material, preferably stainless steel. It is open at the top end and has a closed sidewall 13 and a flat, closed bottom end for supporting the stove upright on an underlying surface when in use. The enclosure 12 surrounds an upper chamber (A) for holding a liquid, and a lower chamber (B) located below the upper chamber for enclosing a heat source. The sidewall 13 includes a plurality of holes (not visible in the drawing) located about the lower chamber to allow the free flow of air into the lower chamber for combustion. Further, a rectangular portion of the sidewall adjacent the lower chamber is removed to form an access passage to the lower chamber to allow inserting, positioning and igniting a solid fuel material.

A circular bottom plate 22, made of like material, is fixed to the inside of the enclosure 12, oriented generally parallel to the top end of the enclosure. Plate 22 has an outside diameter substantially equal to the inside diameter of the enclosure. The peripheral edge of the plate is continuously sealed along the sidewall to form a water tight connection, thereby dividing the enclosure to form upper chamber (A) and the lower chamber (B). The bottom plate 22 includes a central aperture 23, discussed below.

A hollow elongated chimney 14 is symmetrical about its vertical axis and open at a top end 15 and bottom end 16. The chimney is preferably made from a material with superior conductive properties so that heat is efficiently transferred to the liquid, i.e., a metal such as stainless steel. Chimney 14 includes a closed sidewall, tapered to define a truncated cone shape. In addition, the chimney 14 includes corrugations 19 extending lengthwise to maximize its surface area, as best seen in cross section in FIG. 3. The chimney extends vertically through the upper chamber about the enclosure axis from the bottom plate, at least to the top end of enclosure 12, and preferably extends slightly higher than top end 15. The chimney has a bottom end 16 sized and shaped corresponding to aperture 23 in the bottom plate. The chimney is attached to the plate 22 along the inside peripheral edge of the plate and is continuously sealed to form a water tight reservoir and to provide support for the chimney.

In an alternative embodiment, the bottom end of the chimney is circular, having a diameter equal to the inside diameter of the enclosure. The bottom end of the chimney is continuously sealed along the inside of the enclosure sidewall so that the chimney sidewall separates the upper and lower chambers. Such an embodiment obviates bottom plate 22.

A cylindrical outer shell 10, made from like material, concentrically surrounds the enclosure 12 and has an approximate diameter of one half inch greater than that of the enclosure 12 to provide a uniform one-quarter inch insulating space between the shell 10 and the enclosure 12. The insulating space optionally may be filled with thermally insulating material, for example, a closed-cell foam material, to increase insulation of the upper chamber from the ambient environment. The height of shell 10 is approximately the same as the height of the enclosure 12. Additionally, and similar to the enclosure 12, a shell 10 includes a plurality of holes 36 to allow for the free flow of air to the lower chamber (B). Further, a rectangular portion of the outer shell is removed and registered with the same in the enclosure, to allow access to the lower chamber.

The shell 10 and the enclosure 12 are fixed together by an upper ring 20, a lower ring 24, and by a common base plate 30. The upper ring 20 and lower ring 24 are employed to attach the shell 11 to the enclosure 12. The outside diameter of each ring 20, 24 is equal to the inside diameter of the outer shell. Similarly, the inside diameter of both rings is substantially equal to the outside diameter of the enclosure. Both rings are flat and made of heat resistant material, preferably stainless steel. The upper ring is positioned adjacent the top end of the enclosure and shell. The lower ring is positioned approximately level with the plate 22. The outer edge of each ring is intermittently attached to the shell and the inner edge of each ring is intermittently attached to the enclosure.

Base plate 30 provides a common surface for the support of both the shell and the enclosure. Base plate is a solid, flat plate having an outside diameter substantially equal to the inside diameter of the outer shell. The bottom edge of the shell and the bottom edge of the enclosure are each intermittently connected to the base.

A fuel plate 22 is disposed within the lower chamber (B), spaced above the base 30 by a plurality of legs. The fuel plate 22 provides a surface for placement of a solid fuel material. The solid fuel may be a tab formed of, for example, trioxane or hexamine. One such fuel tab is military spec. F-10805C. The fuel is utilized to warm surrounding air in the lower chamber (B). The warm air rises up through the chimney 14 by convection and out the top end 15. The portable stove thus provides for indirect heating of a volume of liquid contained in the upper chamber from within the volume of liquid.

A door 32 is slidingly mounted to the outer surface of the outer shell 10. The door is located near the base for covering the access passage to the lower chamber when access is not needed. The door 32 includes a plurality of holes 38 to allow for the free flow of air for combustion. The door is moveably attached to the outer shell, for example, by two small screws 34.

A circular, flat lid 17, made from similar heat resistant material, has an outside diameter equal to the outside diameter of the shell 10. Lid 17 includes a central aperture sized and shaped to receive a top portion of the chimney 14 so that, when the lid is positioned covering the top end of the enclosure, the top portion of the chimney extends through the aperture, thereby maintaining said positioning of the lid.

In an alternative embodiment (not illustrated), the chimney is not corrugated, but simply defines a truncated-cone shape. The aperture in the lid accordingly is round, sized to receive a top portion of the chimney. In such an embodiment, provision also may be made for locking the lid to the stove by positioning the lid covering the top end of the enclosure and rotating the lid to a locked position. Details of such an arrangement are known.

In one example of an operative embodiment of the invention, the apparatus is formed of stainless steel and has an overall height of approximately 9 inches (23 cm.) and an outside diameter of approximately 4 inches (10 cm.). The upper chamber is about 7½ inches high (19 cm.), and the lower chamber is about 1½ inches high (4 cm.). There is a space of about ¼ inch (0.6 cm.) between the enclosure and the outer shell. The access passage measures about 1 inch high by 2 inches across (2.5 cm. by 5 cm.). The chimney is about 1 inch (2.5 cm.) in diameter at the top end and about 2½ inches (6.3 cm.) diameter at the bottom end.

In an alternative embodiment, a single-wall construction may be used, in which the enclosure and the outer shell essentially are combined into one. Single-wall construction is simpler, and therefore cost is reduced, but at the expense of sacrificing insulation, with the result that the apparatus may become to hot in use to comfortably handle it with the bare hand, and liquid remaining in the upper chamber will cool more quickly. In winter, however, users will appreciate the hand-warming benefit of the stove.

Operation

In operation, the user fills the upper chamber with a liquid to be heated. Following this, the user positions and tightens the lid 16 over the enclosure. The user then opens the door 32 to access the lower chamber and positions a solid fuel tab 28 in the lower chamber on the fuel plate. The fuel tab is ignited by extending a burning match through the access passage into contact with the fuel. The user then slides the door downward until it is closed. Cleaning the stove 10 is easily accomplished by rinsing the surfaces that were in contact with the heated liquid.

A standard military type fuel tab, measuring approximately ¾ inch diameter by ½ inch high, provides enough fuel to warm about 2 cups of water sufficiently to make coffee or hot tea. The tab burns completely in about 5-7 minutes, leaving virtually no residue.

Having illustrated and described the principles of my invention in a preferred embodiment thereof, it should be readily apparent to those skilled in the art that the invention can be modified in arrangement and detail without departing from such principles, I claim all modifications coming within the spirit and scope of the accompanying claims;

I claim:

1. A portable camp stove apparatus, comprising:
   a rigid, upright enclosure having an open top end and a closed sidewall;
   means disposed within the enclosure for defining an upper chamber within said enclosure adjacent the top end for holding a liquid to be heated;
   means disposed within the enclosure for defining a lower chamber within said enclosure below the upper chamber for containing a solid fuel material for heating surrounding air;
   a hollow enlongated chimney formed of a thermally conductive material and having open bottom and top ends and a closed sidewall, fixed within the enclosure with the bottom end in communication with the lower chamber and extending upwardly through the upper chamber at least to the top end of the enclosure;
   means defining an aperture extending through the sidewall adjacent the lower chamber to ventilate the lower chamber; and
   an outer shell having an open top end and closed sidewall, sized and shaped to envelop the enclosure sidewall, and fixed to the enclosure so that the respective sidewalls of the enclosure and the outer shell form a double sidewall for insulating the upper chamber
   whereby, in use, as the solid fuel combusts in the lower chamber, surrounding air heated by the combusting fuel flows from the lower chamber up through the chimney and out of the top end of the chimney and heat transfers through the chimney sidewall from the heated air to heat the liquid.

2. A portable camp stove apparatus, comprising:
   a rigid, upright enclosure having an open top end and a closed sidewall;
   means disposed within the enclosure for defining an upper chamber within said enclosure adjacent the top end for holding a liquid to be heated;
   means disposed within the enclosure for defining a lower chamber within said enclosure below the upper chamber for containing a solid fuel material for heating surrounding air;
   a hollow elongated chimney formed of a thermally conductive material and having open bottom and top ends and a closed sidewall, fixed within the enclosure with the bottom end in communication with the lower chamber and extending upwardly through the upper chamber at least to the top end of the enclosure;
   means defining an aperture extending through the sidewall adjacent the lower chamber to ventilate the lower chamber;
   a rigid plate horizontally disposed within the enclosure, the plate having a peripheral edge continuously sealed against the enclosure sidewall and including means defining a central aperture sized and shaped to receive the chimney; and
   the chimney sidewall adjacent the bottom end of the chimney being continuously sealed along the central aperture means so that he plate divides the interior of the enclosure to define the upper and lower chambers;
   whereby, in use, as the solid fuel combusts in the lower chamber, surrounding air heated by the combusting fuel flows from the lower chamber up through the chimney and out of the top end of the chimney and heat transfers through the chimney sidewall from the heated air to heat the liquid.

3. An apparatus according to claim 2 wherein the chimney is tapered from a first diameter at the bottom end to a second diameter smaller than the first diameter at the top end.

4. A portable camp stove apparatus comprising:
   a rigid, upright enclosures having an open top end and a closed sidewall;
   means disposed within the enclosure for defining an upper chamber within said enclosure adjacent the top end for holding a liquid to be heated;
   means disposed within the enclosure for defining a lower chamber within said enclosure below the upper chamber for containing a solid fuel table for heating surrounding air;
   a hollow elongated chimney formed of a thermally conductive material and having open bottom and top ends and a closed sidewall, fixed within the enclosure with the bottom end in communication with the lower chamber and extending upwardly through the upper chamber at least to the top end of the enclosure wherein the chimney sidewall is corrugated, thereby increasing a surface area of the chimney sidewall to enhance heat transfer through the chimney sidewall;
   means defining an aperture extending through the sidewall adjacent the lower chamber to ventilate the lower chamber; and
   whereby, in use, as the solid fuel combusts in the lower chamber, surrounding air heated by the combusting fuel flows from the lower chamber up through the chimney and out of the top end of the chimney and heat transfers through the chimney sidewall from the heated air to heat the liquid.

5. A portable camp stove apparatus, comprising:

a rigid, generally cylindrical, upright enclosure having an open top end and a closed sidewall;

means disposed within the enclosure for defining an upper chamber within said enclosure adjacent the top end for holding a liquid to be heated;

means disposed within the enclosure for defining a lower chamber within said enclosure below the upper chamber for containing a solid fuel material for heating surrounding air;

a hollow, elongated chimney formed of a thermally conductive material and having a generally truncated cone shape, open bottom and to pends and a closed sidewall, fixed within the enclosure with the bottom end in communication with the lower chamber and extending upwardly through the upper chamber at least to the top end of the enclosure, the bottom end defining an opening of a first diameter and the top end defining an opining of a second diameter smaller than the first diameter, the first diameter being approximately equal to an inside diameter of the enclosure, and the bottom end of the chimney being continuously sealed along the inside of the enclosure sidewall so that the chimney sidewall separates the upper chamber and the lower chamber;

means defining an aperture extending through the sidewall adjacent the lower chamber to ventilate the lower chamber; and a lid, sized to cover the top end of the enclosure and moveably coupled to the enclosure for covering the top end of the enclosure, the lid having an aperture sized to receive a top portion of the chimney so that, when the lid is positioned covering the top end of the enclosure, the top portion of the chimney extends through the aperture;

whereby, in use, as the solid fuel combusts in the lower chamber, surrounding air heated by the combusting fuel flows from the lower chamber up through the chimney and out of the to pend of the chimney and heat transfers through the chimney sidewall from the heated air to heat the liquid.

6. A portable camp stove apparatus, comprising:
a rigid, generally cylindrical upright enclosure having an open top end and a closed sidewall;

means disposed within the enclosure for defining an upper chamber within said enclosure adjacent the top end for holding a liquid to be heated;

means disposed within the enclosure for defining a lower chamber within said enclosure below the upper chamber for containing a solid fuel material for heating surrounding air;

a hollow elongated chimney formed of a thermally conductive material and open bottom and top ends and a closed sidewall, fixed within the enclosure with the bottom end in communication with the lower chamber and extending upwardly through the upper chamber at least to the top end of the enclosure, the bottom end defining an opening of a first diameter and the top end defining an opening of a second diameter smaller than the first diameter, the first diameter being approximately equal to an inside diameter of the enclosure, and the bottom end of the chimney being continuously sealed along the inside of the enclosure sidewall so that the chimney sidewall separates the upper chamber and the lower chamber;

means defining an aperture extending through the sidewall adjacent the lower chamber to ventilate the lower chamber; and a hollow cylindrical shell having an open top end, closed sidewall, a height approximately equal to the height of the enclosure and a diameter greater than the enclosures diameter, disposed about the enclosure in concentric relationship, whereby the enclosure sidewall and the coaxial shell define a space therebetween for insulating the outer shell from the upper chamber;

the shell including at least one aperture adjacent the lower chamber for ventilating the lower chamber.

7. An apparatus according to claim 6 further comprising:
a flat ring having an inside diameter approximately equal to the diameter of the enclosure and an outside diameter approximately equal to the diameter of the shell, fixed along its inside diameter to the top end of the enclosure and fixed along its outside diameter to the top end of the shell, for maintaining the enclosure and the shell in said concentric relationship.

8. A portable method of heating a liquid, the method comprising the steps of:
providing a portable upright enclosure sized to be carried by a person and having a chamber for holding the liquid to be heated;

providing a chimney having open top and bottom ends and a closed sidewall;

forming the chimney of a rigid corrugated material;

positioning the chimney within the enclosure and extending it generally vertically through the upper chamber;

placing the liquid in the chamber so that the liquid surrounds the chimney; and warming air adjacent the lower end of the chimney so that the warmed air flows upwardly through the chimney, whereby heat transfers through the corrugated sidewall from the warmed air to heat the liquid.

9. A portable camp stove apparatus, comprising:
a generally cylindrical enclosure with its length oriented vertically, having an open top end and a closed sidewall and formed of a rigid material;

means disposed within the enclosure for defining an upper chamber within said enclosure adjacent the top end for holding a liquid to be heated;

means disposed within the enclosure for defining a lower chamber within said enclosure below the upper chamber for containing a solid fuel tab for heating surrounding air;

means in the enclosure defining series of apertures extending through the sidewall adjacent the lower chamber to ventilate the lower chamber;

a hollow, generally truncated-cone shaped chimney formed of a thermally conductive material and having open bottom and top ends and a closed, corrugated sidewall, fixed within the enclosure with the bottom end in communication with the lower chamber and extending upwardly through the upper chamber at least to the top end of the enclosure so that liquid in the upper chamber surrounds the chimney, to allow heated air to flow upwardly through the chimney from the lower chamber; and a fuel plate disposed in the lower chamber below the bottom end of the chimney for supporting a solid fuel material, whereby, in use, as the solid fuel combusts, air heated by the combusting fuel flows from the lower chamber up through the chimney and out of the top end of the of the chimney and heat transfers through the chimney sidewall to the liquid to heat the liquid.

10. An apparatus according to claim 9 including:
a rigid, generally circular plate horizontally disposed within the enclosure, the plate having an outer peripheral edge continuously sealed against the enclosure sidewall and an inner peripheral edge defining a central aperture sized to receive the chimney, the inner edge being continuously sealed along the sidewall of the chimney adjacent the bottom end, so that the plate separates the lower chamber and the upper chamber.

11. An apparatus according to claim 9 wherein the enclosure includes means defining an access passage through the sidewall adjacent the lower chamber sized for inserting and igniting a solid fuel material in the lower chamber.

12. An apparatus according to claim 11 further comprising a door, sized to cover the access passage and moveably coupled to the enclosure adjacent the passage so as to allow selectively moving the door between a first position covering the access passage to shield the lower chamber from wind and a second position clear of the access passage to allow access to the lower chamber for inserting, positioning and igniting the solid fuel material.

13. An apparatus according to claim 11 further comprising a generally cylindrical outer shell formed of a rigid material and having an open top end and closed sidewall, and having a diameter greater than the diameter of the enclosure, fixed concentrically about the enclosure so that the respective sidewalls of the enclosure and the outer shell form a double sidewall for insulating the upper chamber, said outer shell including means defining an opening registered with the access passage to allow access to the lower chamber.

14. An apparatus according to claim 13 including a door, sized to cover the opening and slidingly connected to said outer shell for selectively covering the opening.

15. An apparatus according to claim 13 including a flat ring disposed generally parallel to the top end of the enclosure, the ring having an inside diameter approximately equal to the diameter of the enclosure and an outside diameter approximately equal to the diameter of the shell, fixed along its inside diameter to the top end of the enclosure and fixed along its outside diameter to the top end of the shell, for maintaining the enclosure and the shell fixed together in said concentric relationship.

* * * * *

UNITED STATES PATENT AND TRADEMARK OFFICE
CERTIFICATE OF CORRECTION

PATENT NO. : 4,971,027

DATED : November 20, 1990

INVENTOR(S) : Frederick W. Krieger

It is certified that error appears in the above-identified patent and that said Letters Patent is hereby corrected as shown below:

Column 2    line 25, change "maXimum" to --maximum--;

Column 6    line 25, change "that he" to --that the--;

line 40, change "enclosures" to --enclosure--;

line 47, change "fuel table" to --fuel tab--;

Column 7,    line 12, change "to pends" to --top ends--;

line 18, change "opining" to --opening--;

line 40, change "to pends" to --top ends--;

UNITED STATES PATENT AND TRADEMARK OFFICE
CERTIFICATE OF CORRECTION

PATENT NO. : 4,971,027

DATED : November 20, 1990

INVENTOR(S) : Frederick W. Krieger

It is certified that error appears in the above-identified patent and that said Letters Patent is hereby corrected as shown below:

Column 8, line 7, change "enclosures" to --enclosure--.

Signed and Sealed this

Eleventh Day of May, 1993

Attest:

MICHAEL K. KIRK

*Attesting Officer*     *Acting Commissioner of Patents and Trademarks*